United States Patent [19]

Chen et al.

[11] Patent Number: 4,842,778
[45] Date of Patent: Jun. 27, 1989

[54] APPARATUS FOR FLOW DISTRIBUTION IN PACKED TOWERS

[75] Inventors: Gilbert Chen, Farmers Branch, Tex.; Timothy L. Holmes, Sports, N.J.; Augusto Mastrodomenico, Rome, Italy; Michael J. Binkley, DeSoto, Tex.

[73] Assignee: Glitsch, Inc., Dallas, Tex.

[21] Appl. No.: 123,811

[22] Filed: Nov. 23, 1987

Related U.S. Application Data

[63] Continuation of Ser. No. 812,704, Dec. 23, 1985, abandoned.

[51] Int. Cl.$^4$ ............................................. B01F 3/04
[52] U.S. Cl. ............................... 261/97; 261/112.2
[58] Field of Search ............................ 261/97, 112.2

[56] References Cited

U.S. PATENT DOCUMENTS

| | | | |
|---|---|---|---|
| 1,715,253 | 5/1929 | Sperr, Jr. | 261/111 |
| 1,809,646 | 6/1931 | Sperr, Jr. | 261/97 |
| 2,356,653 | 8/1944 | Cox | 261/111 |
| 3,290,024 | 12/1966 | Huber | 261/97 |
| 3,353,799 | 11/1967 | Lions | 261/112 |
| 3,450,393 | 6/1969 | Munters | 261/112 |
| 3,466,151 | 9/1969 | Sicard et al. | 261/112.2 |
| 3,500,615 | 3/1970 | Meek | 261/112 |
| 3,785,620 | 1/1974 | Huber | 261/112 |
| 3,916,021 | 10/1975 | Hajek et al. | 261/97 |
| 3,959,419 | 5/1976 | Kitterman | 261/112 |
| 3,963,810 | 6/1976 | Holmberg et al. | 261/112.2 |
| 4,499,031 | 2/1985 | Sexton et al. | 261/112 |
| 4,597,916 | 7/1986 | Chen | 261/112 |
| 4,604,247 | 8/1986 | Chen et al. | 261/112 |
| 4,623,454 | 11/1986 | Tauscher et al. | 261/112.2 |

FOREIGN PATENT DOCUMENTS

| | | | |
|---|---|---|---|
| 1250197 | 11/1960 | France | 261/97 |
| 1457440 | 12/1976 | United Kingdom | 261/97 |

OTHER PUBLICATIONS

Packed Column Internals, Chen, Chemical Engineering, 3-5-84, pgs. 40-51.

Primary Examiner—Tim Miles
Attorney, Agent, or Firm—Thomas L. Cantrell; Stanley R. Moore

[57] ABSTRACT

Process tower vapor/liquid flow distributor and packing bed comprising a plurality of relatively thin corrugated layers stacked one atop the other. The corrugated sheets are disposed in face to face contact with respective corrugations inclined to the horizontal and facing one another for the countercurrent passage of vapor and liquid therethrough. At least two layers are utilized and rotationally offset for diverting the vapor liquid in two separate directions to effect maximum vapor liquid distribution for countercurrent fluid flow passing therethrough. An improved homogenous mixture of vapor/liquid within the process tower packing sections may thus be provided. The assembly affords optimal pressure drop characteristic while maximizing even vapor/liquid distribution into the packing regions. In this manner the distribution sections may be disposed throughout the process tower above and below each packing section, or in place of the packing section for distributing the descending liquid flow as well as the ascending vapor flow therethrough. This configuration maximizes the efficiency of the distribution thereacross and the homogenous mixture interaction therein.

4 Claims, 4 Drawing Sheets

APPARATUS FOR FLOW DISTRIBUTION IN PACKED TOWERS

This application is a continuation of application Ser. No. 812,704, filed 12-23-85, now abandoned.

BACKGROUND OF THE INVENTION

1. Field of the Invention

The present invention pertains to flow distributor system for vapor liquid contact towers and, more particularly, to a vapor/liquid distributor for columns incorporating counter-current vapor liquid flow therethrough.

2. History of the Prior Art

It is well known in the prior art to utilize various types of exchange columns in which a gas and a liquid come into contact with one another, preferably in a counter-current flow for purposes of mass or heat transfer, close fractionation and/or separation of feed stock constituents, and other unit operations. Efficient operation requires mass transfer, heat transfer, fluid vaporization and/or condensation, whereby one of the fluids can be cooled with a minimum pressure drop through and in a particular zone or zones of minimum dimensions defining the area and volume thereof. These are prerequisites of efficient operation and are necessary for close fractionation. For this reason counter-current flow of vapor and liquid within such exchange columns have become established methods of such vapor liquid contact in the prior art. The actual vapor liquid interface requires the utilization of a packing bed within the column. Liquid is then distributed atop the packing bed in the most feasible manner while vapor is distributed beneath the packing bed in the lower region of the tower. In this manner liquid trickling downwardly through the packing bed is exposed to the vapor ascending therethrough for vapor liquid contact and interaction. These aspects are more particularly set forth in an article entitled "Packed Column Internals" appearing in the Mar. 5, 1984 edition of *Chemical Engineering* authored by Dr. Gilbert Chen, one of the inventors herein.

It is well established that the configuration of the packing bed determines the pressure drop, efficiency of the vapor liquid interface and the concomitant mass and energy transfer occurring in a process tower. The means for effective and even distribution of the vapor and the liquid on opposite ends of the packing bed as well as maintenance of that distribution therethrough are critical to an efficient operation. Only with efficient initial vapor and liquid distribution and the maintenance of said distribution throughout the packing bed, will homogenous mixing zones be created therethrough for maximizing the efficiency therein. Efficiency is readily convertible to cost of operation and production quality. For this reason, a myriad of prior art packing designs have been prevalent in conventional exchange columns. The efficiency of the packing is, however, limited to a large extent by the efficiency of the vapor and liquid distribution thereacross For example, failure of either vapor or liquid to evenly distribute over cross-sections of the packing effectively eliminates the utility of the part of the packing where there is poor or no distribution which in turn is directly proportional to the efficiency and cost effectiveness of the operation thereof. Packing bed depths are critical in establishing production criteria and operational costs and failure to evenly distribute vapor liquid and/or maintain homogeniety within the packing bed can lead to serious consequences, particularly in the petroleum refining industry and related areas.

Conventional liquid distributors generally comprise a multi-orifice spray head adapted for dispersing liquid in the form of a spray atop the packing bed. In the utilization of dump packing wherein a plurality of randomly oriented packing elements are disposed within the exchange column, such a liquid distribution technique is sometimes effective. This is true particularly when high efficiency parameters are not of critical significance. However, in the event of high efficiency packing such as that set forth in U.S. Pat. Nos. 4,597,916 and 4,604,247; assigned to the assignee of the present invention, means for homogeneous liquid and gas distribution are of extreme importance. The cost of high density packing of the type set forth in the aforesaid patent applications commands attention to the vapor liquid distribution problem. Even small regions of non-homogenous interaction between said vapor and liquid is an expensive and wasteful loss not consistent with the utilization of high efficiency packing where space and homogeniety in vapor liquid interface is both expected and necessary for proper operation. High efficiency packing of the state of the art varieties as set forth and shown in the aforesaid U.S. patent applications requires counter-current vapor liquid flow through the channels defined by opposed corrugations of sheets disposed therein. If the initial liquid or gas distribution fails to enter a particular corrugation pattern, then precious surface area is lost in the high efficiency packing until the liquid and vapor are urged to migrate into and interact in the unfilled regions of the packing. Only by utilizing proper vapor and liquid distribution means may effective and efficient utilization of high efficiency packing as well as conventional dumped packing be assured.

The development of systems for adequate vapor and liquid distribution in process towers has been limited as set forth above. In the main, it is known to discharge liquid in a more or less patterned spray for adequate liquid distribution and concomitantly to discharge gas in a turbulent configuration to provide adequate vapor distribution. Though generally effective in distributing some vapor and some liquid to most portions of the packing bed, uniform distribution thereacross is generally not obtained without more sophisticated distribution apparatus. For example, unless gas is projected into a myriad of contiguous areas beneath the packing bed with equal pressure existing in each area, the mass flow of vapor upwardly through the packing bed cannot be uniform. Random vapor discharge simply distributes unequal amounts of vapor across the lower regions of the packing bed but does not in any way assure equality in said distribution. Likewise the spray of liquid atop the packing bed though intended to be effective in wetting all surface areas often results in high concentrations of liquid flow in certain packing bed areas, depending on the spray device. Unfortunately, uneven liquid distribution generally occurs in the vicinity of the most even vapor distribution and vice versa. This is because vapor has had a chance to more evenly distribute through the packing bed prior to engaging the liquid distribution flow. It would be an advantage, therefore, to provide means for even liquid and vapor distribution prior to entry of said vapor and liquid into the packing bed and in a manner providing both a uniform spread of said liquid and vapor and a uniform volumetric distribution thereof.

The present invention provides such an improved system of vapor liquid distribution through a sandwiching of two or more relatively thin layers of corrugated, perforated, high efficiency packing, the layers being angularly disposed one to the other. The multi-layer distributor packing is provided in a thin configuration relative to the diameter of the tower and fabricated from a plurality of corrugated sheets angularly inclined one to the other having apertures formed therein for the passage of vapor and/or liquid therethrough. When used in conjunction with a similar high efficiency packing bed, the corrugations of the vapor and/or liquid distributor are equal to and/or larger than the corrugations of the packing bed In this manner pressure drop is not adversely affected through the distributor and the advantages of effective uniform vapor and liquid distribution in a homogeneous flow are obtained. The angular orientation likewise causes sufficient lateral distribution to evenly distribute volumetric flow uniformly across the packing bed for both vapor and liquid interaction and heat and mass transfer. Moreover, in this manner similar vapor liquid distributors may be utilized atop the packing bed for distribution of liquid flow, beneath the packing bed for distribution of ascending vapor flow therethrough and/or as part of the packing bed whereby maximum distribution would be achieved prior to engagement of the vapor and/or liquid in the packing bed in accordance with the principles of the present invention.

SUMMARY OF THE INVENTION

The present invention pertains to flow distribution systems adapted for uniformly distributing liquid and vapor in counter-current flow through a process tower. More particularly, one aspect of the invention comprises an improved vapor and liquid distributor for process columns of the type wherein vapor is injected into the column for ascension therethrough and liquid is dispersed atop the column for downward flow. Packing sections are disposed in the tower for facilitating the interaction of vapor and liquid passing in counter-current flow therethrough. The improvement comprises a flow distributor adapted for positioning above and below the packing section for the even distribution of liquid downwardly and of vapor ascending upwardly therethrough for the homogenous interaction therein. The distributor packing section comprises a plurality of thin layers of corrugated sheets relative to the tower diameter angularly oriented one to the other in face to face relationship. The plurality of layers are also rotationally oriented one to the other for bi-directional lateral dispersion and full distribution of the vapor and liquid passing therethrough.

In another aspect the apparatus as set forth above includes in combination the process column packing comprising high density packing formed of corrugated sheets. The corrugations of each sheet are angularly oriented one to the other in face to face relationship. The distribution packing sheets comprise corrugations having a depth equal to or greater than the corrugation depth of the packing in the proper bed. The adjacent sheets of the distributor packing sections may also comprise corrugations oriented generally orthogonally one to the other for enhancing the lateral vapor liquid distribution therethrough. The sections of corrugated sheets generally have a thickness on the order of three inches and preferably between ½ to ⅓ of a standard structured packing section height.

In yet another aspect, the invention includes the process tower vapor liquid distributor described above which comprises a plurality of corrugated sheets in face to face contact with opposed corrugations inclined oppositely one to the other. The corrugations receive a descending liquid flow concomitantly with an ascending vapor flow. A plurality of apertures may be formed therein and the distribution sections are assembled in at least two layers one atop the other, the layers being rotated relative one to the other for effecting bi-directional vapor and liquid distribution of fluids passing in counter-current flow therethrough A banding member may be provided for binding the first and second layers one to the other in the pre-selected rotational relationship. The layers may be positioned above, below, or as part of the packing bed for maximum vapor/liquid distribution.

In yet a further aspect, the invention includes an improved method of imparting vapor liquid distribution within a process tower of the type comprising the steps of providing a generally vertical tower having means for ingressing the flow of vapor at the lower region thereof and means for ingressing a stream of liquid from the upper region thereof. A series of layers of packing arrays are disposed therebetween for receiving the descending flow of liquid and the ascending flow of vapor concomitantly therethrough. The arrays provide for thorough mass and heat transfer therebetween. The improvement comprises the steps of providing a vapor liquid distributor section above and below each grid array. The distributor sections include at least two layers of corrugated sheets in face to face contact with the layers being rotationally angled one to the other for imparting bi-directional vapor and liquid flow therethrough. Each layer is formed of a width to corrugation length ratio affording fractional lateral dispersion into the contiguous rotated layer and bi-directional, substantially equalizing flow distribution therethrough.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
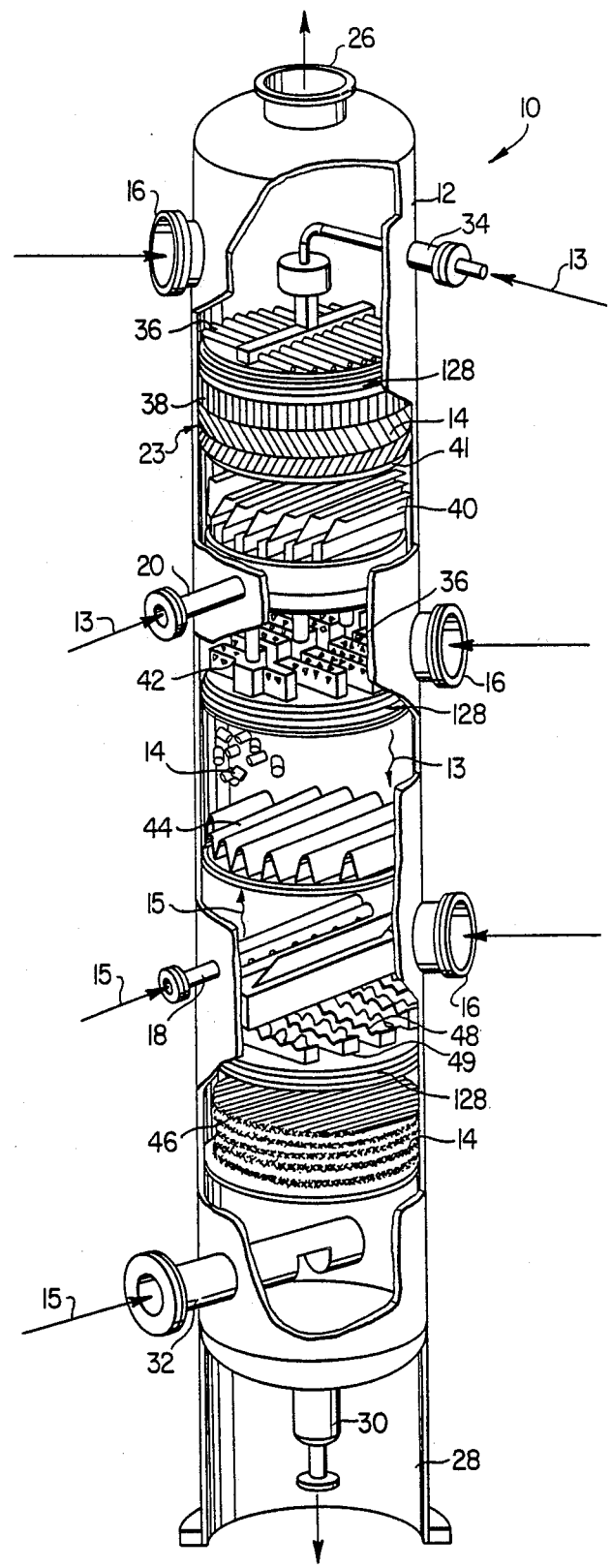
FIG. 1 is a perspective view of a packed column with various sections cut away for illustrating a variety of internals and one embodiment of a flow distributor constructed in accordance with the principles of the present invention.

Referring first to FIG. 1 there is shown a perspective view of a packed exchange column with various sections cut away for illustrating a variety of internals and the utilization of one embodiment of the packing system of the present invention. The exchange column 10 of FIG. 1 comprises a cylindrical tower 12 having a plurality of packing bed layers 14 disposed therein. A plurality of manways 16 are likewise constructed for facilitating access to the internal region of the tower 12 for placement of the packing beds 14. Vapor 15 is fed to the tower 12 through feedlines 18 while liquid 13 is fed through feedlines 20, therein facilitating counter-current vapor-liquid flow through the packing beds 14.

Still referring to FIG. 1 the exchange column 10 further includes a vapor outlet 26 disposed atop the tower 12 and a lower skirt 28 disposed in the lower region of the tower around a circulation pipe 30 coupled to a reboiler (not shown). A reboiler return conduit 32 is shown disposed above the skirt 28 for recycling vapor 15 therein upwardly through the packing layers 14. Reflux from condensers is provided in the upper tower region 23 through entry conduit 34 wherein reflux liquid 13 is distributed throughout a liquid distributor 36 across upper packing bed 38. It may be seen that the upper packing bed 38 is of the structured packing variety wherein a distributor packing (described below) is disposed for liquid distribution. The regions of the exchange column 10 beneath the upper packing bed 38 are shown for purpose of illustration and include a liquid collector 40 disposed beneath a support grid 41 in support of the upper structured packing 38. A liquid redistributor 42 is likewise disposed therebeneath and an intermediate support plate 44 is provided in an alternative configuration of the type adapted for supporting random packing 14 of the ring or saddle variety, as representatively shown. A lower structured grid 46 is illustrated disposed beneath an alternative form of liquid distributor 48 comprising a plurality of troughs 49 adapted for dispersing the liquid thereacross in counter-current flow to the ascending vapor therebeneath.

The column 10 is shown to include both random packing 14 of varying packing bed height as well as structured packing 14. The structured packing sections 14 are generally provided in established heights, such as 9.5 inches to 12 inches. This is generally due to mechanical and/or manufacturing considerations and may vary.

It may thus be seen from this figure that the countercurrent configuration between the ascending vapor and the descending liquid is the subject of a plurality of critical design considerations including size/dimension ratios, liquid/vapor ratios, liquid cooling, foaming and the presence of solids or slurries therein. Corrosion is likewise a consideration of the various elements in the packed towers and the selection of the material in the fabrication of the tower internals is in many instances the results thereof. The anatomy of the packed column as shown in FIG. 1 is likewise described in more detail in the Gilbert Chen article referred to above and incorporated herein by reference.

Figure 2:
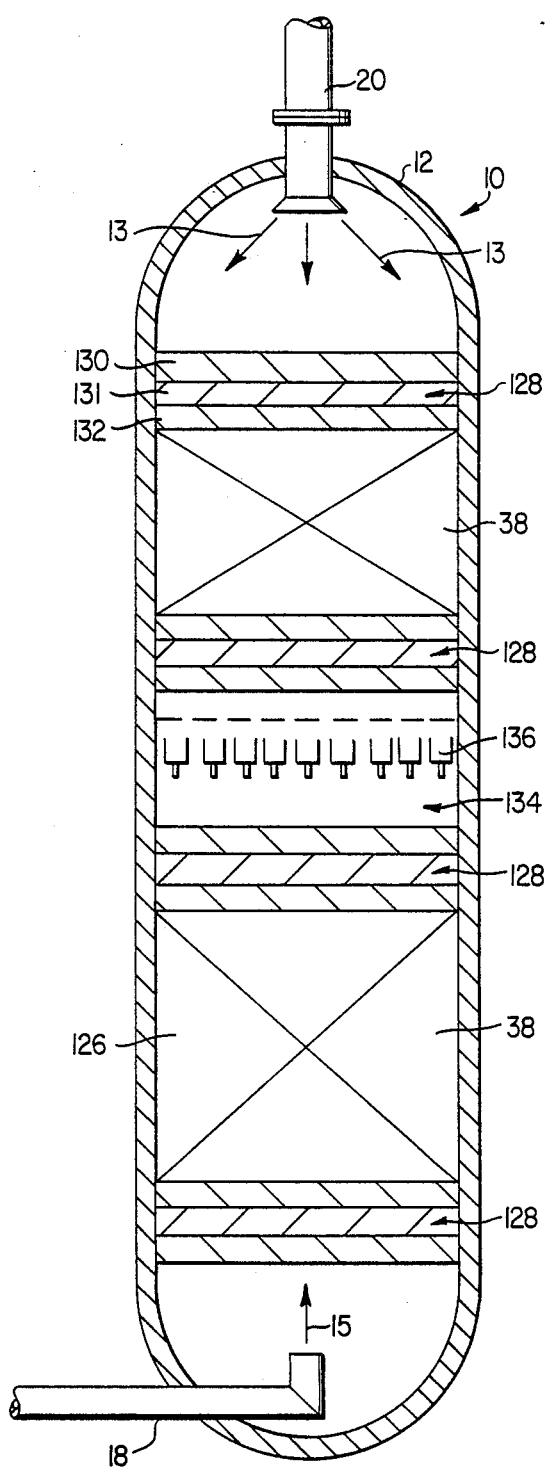
FIG. 2 is an enlarged, side-elevational, diagrammatical view of the process column of FIG. 1 illustrating one embodiment of the distribution packing of the present invention disposed above and below packing beds secured therein.

Referring now to FIG. 2 there is shown a diagrammatic, side-elevational, cross-sectional view of the exchange column 10 which is not drawn to scale. The tower column 12, or containment vessel, is adapted for the flow of liquid 13 downwardly from feedlines 20 secured in the upper end of said vessel. At the lower end of the vessel 12, vapor 15 is discharged from a supply line 18 for the counter-current flow, interaction mixing and mass heat transfer between the vapor and liquid. The interaction and mass/heat transfer occurs within the regions of the column 10 where packing 38 is disposed. The packing 38 as shown herein may be of any of a variety of types including dumped packing or structured high efficiency packing. High efficiency packing of the type comprising corrugated and perforated sheets provides excellent mass heat transfer as shown in the aforesaid U.S. Pat. No. 4,604,247.

Still referring to FIG. 2, the distribution of liquid 13 and vapor 15 within the vessel 12 is effected by flow distribution sections 128 secured at selected vertical positions therein. Flow distributer sections 128 of the present invention comprise two or more thin sections of corrugated and perforated sheets, relative to the tower diameter, disposed in angular relationship one to the other. These sections are generally $\frac{1}{2}$ to $\frac{1}{3}$ the conventional packing section heights and preferably in the order of 3 inches. In the present embodiment, three corrugated layers 130, 131 and 132 are disposed one atop the other to comprise each flow distributor section 128. Each layer or section 130, 131 and 132 is approximately one-third of a conventional packing section height and angularly rotated relative to the others for purposes of maximizing lateral distribution of vapor or liquid passing therethrough. The placement of distributor sections 128 is also shown in FIG. 1, above and below various packing sections 14 of packing beds 38. In this manner, flow distributors 128–128 are disposed immediately beneath the liquid discharge head 20 (of any variety) for distributing the liquid 13 uniformly across the packing 38 disposed in the upper end of the containment vessel 12. Likewise, a distributor packing section 128 is disposed beneath upper packing 38 for evenly distributing upwardly rising vapor thereto for homogeneous interaction within said packing.

The intermediate region 134 of the containment vessel 12 may include a vapor liquid distribution assembly 136 of generally conventional design of the type generally utilized for such process columns 10. The utilization of the distribution packing 128 of the present invention further facilitates reduction in the necessary vertical height in region 134 that the intermediate vapor liquid distribution assembly 36 normally requires relative to the packing 38 disposed within the container vessel 12.

As described in more detail below, the utilization of the relatively thin corrugated layers ($\frac{1}{2}$ to $\frac{1}{3}$ of conventional thicknesses) assembled in accordance with the teachings of the present invention affords not only vapor liquid distribution but effective vapor liquid interaction. This is due in part to the fact that the distribution section is comprised of the very same type of corrugated apertured angulated material comprising structured packing sections as set forth above. By the provision of these sections in thicknesses which are thin relative to the overall diameter of the tower permits lateral dispersion of the liquid therein by engaging an underlying corrugated section oriented in an angular relationship thereto. The drawings described below illustrate the flow pattern and the homogenous distribution therethrough by the utilization of angulated corrugated sections having a reduced height. The distributor sections may be 2 inches to 8 inches thick, although sections on the order of three inches have proven most effective in a variety of tower diameters ranging from two feet to forty feet. The term relatively thin, as used herein, refers to a structured packing section which is of less height than is conventional for that type of construction and is also related to tower diameter. A relatively thin layer 130 may be only two inches thick in a two foot diameter tower and it may be eight inches thick in a forty foot diameter tower. In certain embodiments also discussed below, the relatively thin distributor sections may in themselves be utilized as packing bed sections 38. For this reason their utilization as distributors are given the same value and advantages as a high efficiency packing bed. In this manner effective packing bed height is actually increased by the utilization of the distributors of the distribution assembly of the present invention as compared to various prior art embodiments which are not vapor liquid interaction regions and which effectively necessitate a taller vessel 12 for equivalent packing bed height therein.

It may further be seen that as liquid 13 is redistributed in region 134 it is then passed through a flow distributor 128 disposed atop a lower packing section 126 which itself is secured atop an underlying flow distributor section 128 disposed atop the vapor discharge conduit 18. In this manner vapor 15 ascending in the containment vessel 12 is initially distributed through the angularly oriented layers 130, 131 and 132 prior to passage into an homogenous mixture with the descending liquid 13 in lower packing region 38. As stated above, the utilization of high efficiency packing necessitates even vapor liquid distribution for effective utilization therein.

Figure 3:
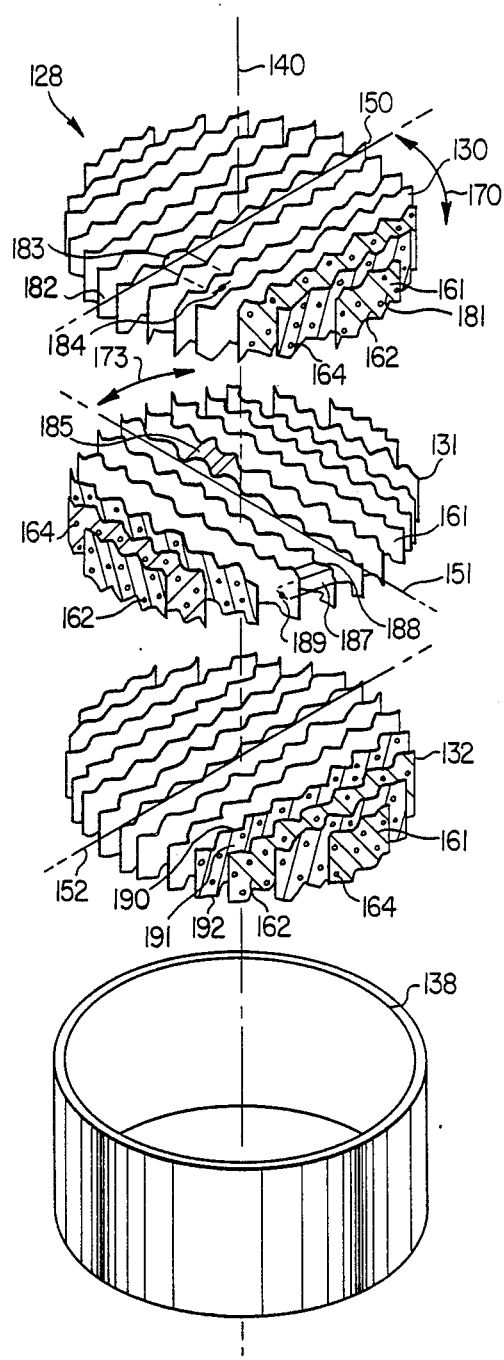
FIG. 3 is an exploded, perspective view of one embodiment of the distribution packing of FIG. 1 constructed in accordance with the principles of the present invention.

Referring now to FIG. 3 there is shown an enlarged perspective view of the flow distributor packing 128 of the present invention. The three layers 130, 131 and 132 are thus shown in enlarged, exploded detail to comprise sheets 161 with corrugations 162 and perforations 164. The corrugated sheets 161 are angularly oriented one to the other generally in accordance with the teachings of the aforesaid U.S. Pat. No. 4,604,247 assigned to the assignee of the present invention and referred to above. The sheets 161 are relatively short in height for the purpose of reducing the overall vertical length of the distribution packing assembly 128 which saves height within the process column 10. A savings of height permits the placement of more packing 38 and higher efficiency and energy savings. As further shown herein each layer 130, 131 and 132 is concentrically aligned about an axis 140 during the stacking process and is turned relative to the adjacent packing layer. For example, upper layer 130 is constructed with a notional sheet axis 150 parallel to the various corrugated sheets 161 which is rotated at an angle 170 relative to the underlying axis 151 of layer 131. Likewise axis 151 of layer 131 is rotated at an angle 173 relative to axis 152 of underlying layer 132. In this manner vapor or liquid passing through the various layers 130, 131 and 132 of the flow distributor packing region 128 is bi-directionally redirected for maximum efficiency and distribution and homogenous mixture therethrough.

Still referring to FIG. 3, the assembly of the distributor packing 128 preferably incorporates the utilization of a band 138 secured around the packing layers 130, 131 and 132. This assembly facilitates the handling and installation of the flow distributor 128 within the containment vessel 12. Moreover, the utilization of band 138 forms a discrete package which may be easily handled and arranged therein. The rotational orientation of the packing sections 130, 131 and 132 is then secured by the band 138 during shipping and installation. The flow distributor layers are thus packaged in an assembly capable of select positioning throughout an exchange tower.

As shown in FIGS. 2 and 3 in combination, the construction and relative size of the packing layers 130, 131 and 132 as well as the corrugations formed therein is a function of the size of the containment vessel and other operational parameters. Each layer 130, 131 and 132 is preferably formed of a width to corrugation length ratio affording fractional lateral dispersion into the contiguous rotated layer and bi-directional, substantially equalizing flow distribution therethrough. The upper layer 130 is comprised of corrugations 181, the length of which is substantially less than the width, or diameter 182 of the layer 130. In this manner flow therealong is angularly disposed from a first lateral position 183 a relatively short lateral span to position 184 formed along the bottom edge of the layer 130. At the point 184, descending fluid flow then engages a corrugation channel 185 formed in layer 131 which redirects said descending fluid flow in a second direction which is lateral to the axis 150 of layer 130. In this manner, bi-directional fluid flow is established and only fractional lateral dispersion is provided into the contiguous rotated layers within the distributor packing to facilitate bi-directional, substantially equalizing flow distributon therethrough. Likewise a corrugation channel 187 beginning at upper corrugation point 188 and terminating in lower corrugation channel point 189 of layer 131 will abut and engage upper end 190 of corrugation channel 191 which terminates at a lower point 192 therebeneath. Corrugation channel 191 is provided at a lateral angle 173 relative to layers 131 and 132. This redirection of descending fluid flow is likewise re-directional and further shifts the fluid flow a fractional lateral distance across the flow distributor 128. The multiplicity of corrugations in the layers 130, 131 and 132 then provide a relatively large number of lateral dispersion channels which extend a fractional distance relative to the width of the corrugation layers 130, 131 and 132. Such fractional lateral dispersion permits enhanced flow redistribution and equalization as compared to a conventional corrugated packing element whose corrugation channel length approximates and/or is on the same order of magnitude as the width thereof. In such configurations the flow is often channeled to the side wall of the packing section resulting in fluid accumulations which necessitates the flow distributor of the present invention. The layer width to corrugation length ratio affords the fractional lateral dispersion which is critically important in high efficiency packing systems for proper process tower operation. Likewise the angle of rotation between the layers and the placement of apertures therethrough further affords control as to the type of lateral flow distribution bi-directionality and flow equalization provided therein. It may be seen that two layers 130 and 131 rotated relative one to the other provide the aforesaid flow characteristics although a series of three layers has been shown to be effective in high efficiency packing configurations. By providing the corrugations of the distributor layers of a size equal to or greater than the size of the corrugations of the packing 38, pressure drop does not become a problem and the effective height of the column can be improved.

Figure 4:
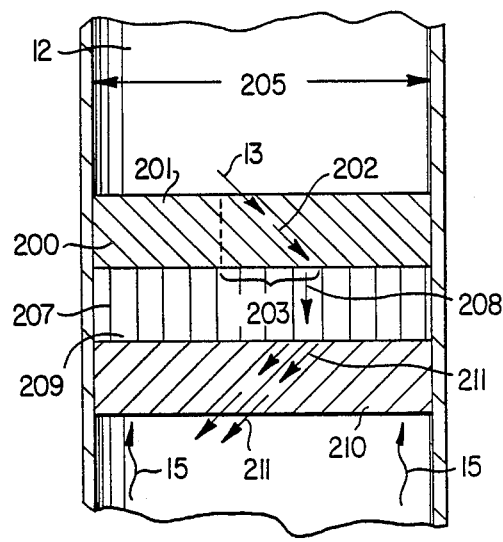
FIG. 4 is side elevational, cross-sectional, diagrammatic view of the assembled distribution packing of FIG. 3 illustrating the bi-directional, lateral dispersion of fluid flowing therethrough.

Referring now to FIG. 4 there is shown a side-elevational cross-sectional, enlarged view of the flow distributor section 128 of the present invention illustrating a diagrammatical view of the flow of liquid therethrough. Liquid 13 descending downwardly within the vessel 12 flows at an angle through the corrugations of the distribution packing layer. Upper layer 200 thus shows liquid flowing through a corrugation 201 as illustrated by arrow 202. Arrow 202 forms an angle relative to the horizontal and carries the fluid a distance 203 as shown herein. Distance 203 is relatively small compared to the diameter 205 of the vessel 12. In this manner the liquid is relatively quickly discharged onto an underlying distribution layer 207 which is rotated relative to upper layer 200. The rotation as shown in FIG. 3 results in the descending liquid 13 entering a plurality of corrugated sections across the upper surface thereof (to be shown in more detail below). Arrow 208 thus illustrates the downward flow of liquid 13 along a plurality of corrugated channels which cannot be seen in this diagrammatic representation. However, the discharge through the plurality of corrugated channels causes the liquid 13 to disperse along the lower surface 209 of section 207 to there engage a plurality of corrugated channels of underlying section 210. Flow arrows 211 represent the multiple flow patterns of liquid 13 discharging therefrom at an angle generally opposite to that of layer 200. This flow pattern will be explained in more detail below but provides an immense amount of distribution relative to conventional prior art packing due to the thin distributor section construction relative to the diameter 205 of the vessel 12. This diagrammatic representation further illustrates the bi-directional flow distribution and lateral dispersion of the liquid 13 descending therethrough. The same holds true for vapor 15 ascending upwardly therein which is not shown in more detail for purposes of clarity.

Figure 5:
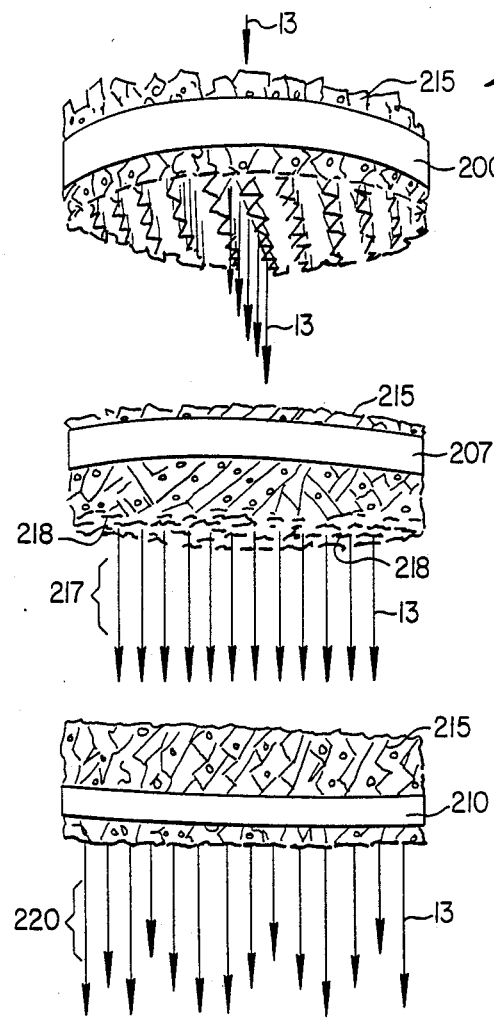
FIG. 5 is an exploded, perspective view of the three packing layers of FIG. 2 laterally dispersing the flow of liquid therethrough.

Referring now to FIG. 5 there is shown a perspective view of three distributor layer inserts 200, 207 and 210 provided in an exploded configuration for illustrating the flow of liquid therethrough. The top layer 200 is shown to receive a first generally focused flow of liquid 13 along a top surface thereof which flow of liquid is laterally dispersed in a somewhat narrow pattern and discharged from the bottom region thereof along a series of adjacent corrugated sheets 215. The second layer 207 receives the narrow lateral dispersed flow of liquid 13 from the upper layer 200 which, due to the orthogonal orientation of the second layer relative to said upper layer, imparts fluid along the central region of each of the parallel corrugated members 215. Through bi-directional lateral dispersement the liquid 13 is thus discharged from the lower edge of the intermediate layer in a generally uniform pattern of streams 217 emanating from numerous corrugation drip points 218 widely dispersed in a generally symmetrical pattern thereacross. These descending streams 217 thus engage the third, orthogonally oriented layer 210, along the various corrugation paths of the upper surface thereof. Due to the even distribution of streams 217 the final discharge pattern 220 is not only uniform but of a more finite even flow therefrom as illustrated in the drawing which represents an actual photographic illustration produced under laboratory conditions. Thus a packing bed 38 disposed therebeneath receives an evenly distributed uniform flow thereacross for maximum efficiency in vapor liquid interaction.

Figure 6A:
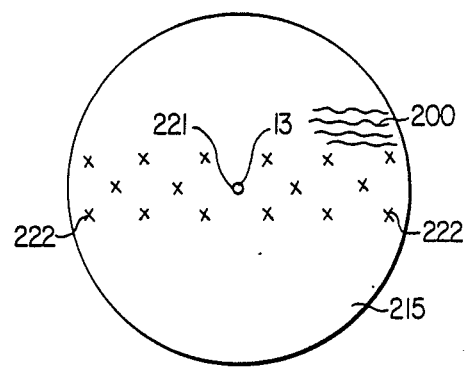
FIGS. 6A, 6B and 6C are top-plan views of the three flow distributor layers of FIG. 5 illustrating the liquid flow pattern therethrough.
Figure 6B:
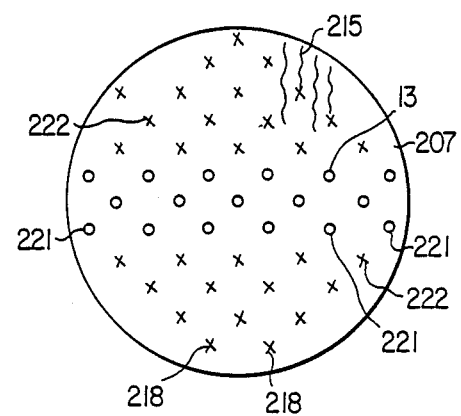
Figure 6C:
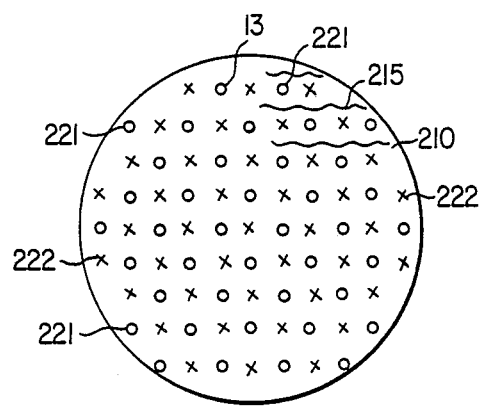

Referring now to FIG. 6A, 6B and 6C there is shown a top plan view of the three distributor packing layers 200, 207 and 210, respectively, diagrammatically illustrating the flow of liquid therethrough. The top layer 200 of FIG. 6A is shown to receive a concentrated flow of liquid 13 along the top surface thereof through dots 221. The flow is laterally and bi-directionally dispersed through the adjacent corrugated plates 215 (shown schematically) into the discharge pattern shown by x's 222 therebeneath. The middle distributor packing layer 207 of FIG. 6B thus receives the lateral flow of liquid by dots 221. The middle layer 207 of this embodiment, is oriented 90° relative to the upper layer 200 whereby the corrugations run orthogonal to the corrugational alignment of said upper layer. For this reason the receipt of the lateral liquid flow is dispersed into the flow pattern shown by x's 222 widely spread across the surface of the middle layer. This wide flow pattern is received by the bottom layer 210 (as shown by dots 221 of FIG. 6C) which is itself rotated relative to the middle layer 207 and results in a more evenly dispersed flow pattern 220 from a greater number of drip points 218 from the corrugations due to the lateral bi-directional dispersion of the fluid therethrough.

Figure 7:
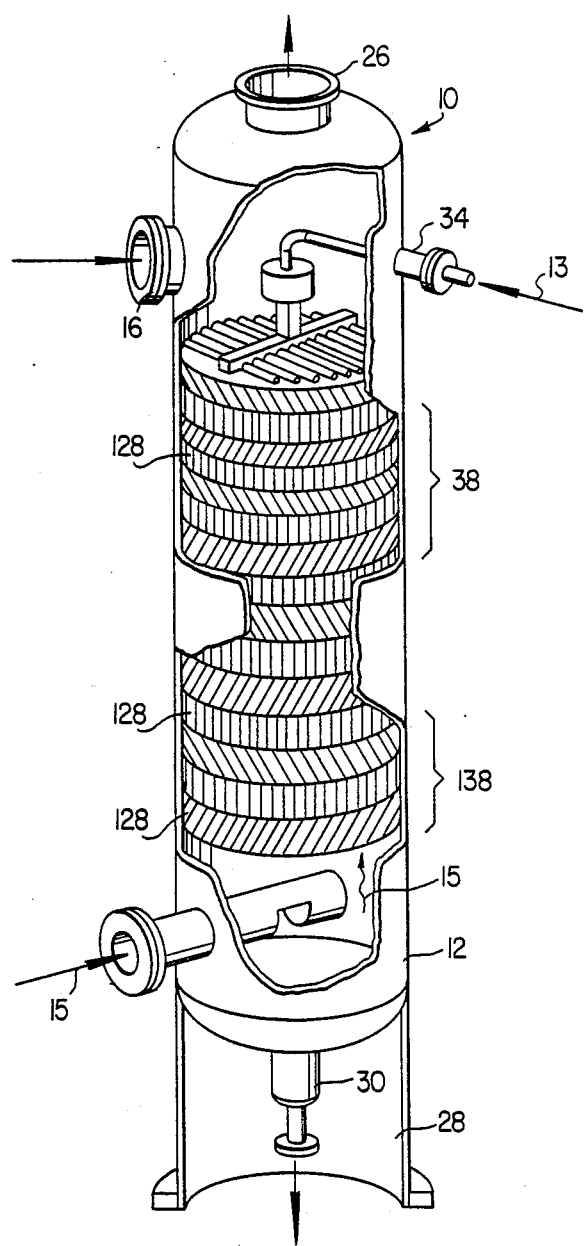
FIG. 7 is a perspective view of the packed column of FIG. 1 with an alternative embodiment of a packing bed section comprising a plurality of the liquid distributor layers of FIG. 3 disposed therein.

Referring now to FIG. 7 there is shown a perspective view of an alternative embodiment of the process tower of FIG. 1 illustrating the placement of a plurality of distribution layers 128 comprising an elongate flow distributor in place of a standard packing bed and vapor and/or separate liquid distributor. The utilization of a plurality of their vapor liquid distributor sections in a packed array 128 of the structured packing variety is an advancement over the prior art by utilizing the distributor configuration itself in a high efficiency, high density packing configuration. As set forth above, very little pressure differential or efficiency is lost by the utilization of the relatively thin configuration of the distributor packing arrays when used in a process tower. It has been shown in FIGS. 1-6 that the utilization of two or more relatively thin cross-sections having a height of at least one half to one third of a conventional packing section produces greater efficiency without separate distributors. It may also be used in a packing configuration. By utilizing the distributor layers in the packing configuration it is no longer necessary to use a separate vapor or liquid distributor. In this manner vapor or liquid distributors may be eliminated in the process column 10 as shown in FIG. 7. Maximum height efficiency is thus established, which is a critical goal of operation. The other aspects of the distributor column shown in FIG. 7 are illustrated for purposes of clarity in showing the various fluid flow and vapor ascension configurations typical of prior art and conventional process tower and fractionation technology.

Figure 8:
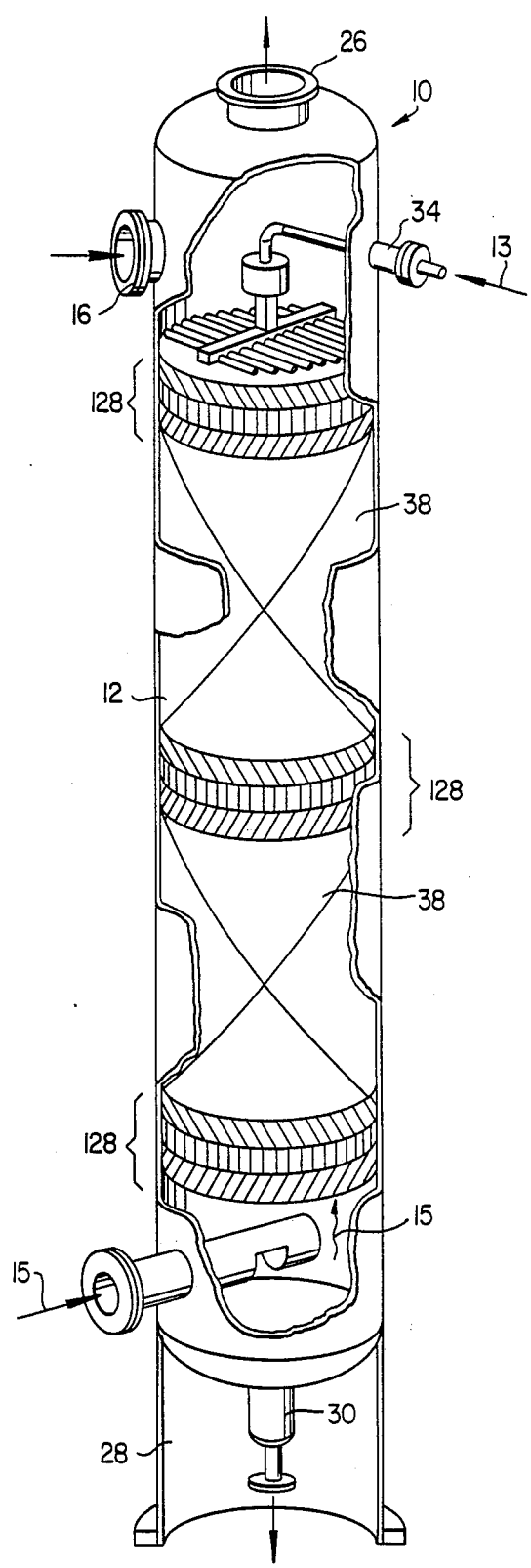
FIG. 8 is a side-elevational, cross-sectional view of the packing tower of FIG. 1 illustrating the placement of the liquid distributor layers of FIG. 3 directly between packing beds therein

Referring now to FIG. 8 there is shown a plurality of vapor liquid distributors 128 disposed between high efficiency packing beds 38 for purposes of illustrating vapor and liquid flow in counter-current ascension and descension therethrough. The vapor liquid contact distribution sections 128 are disposed in direct counterflow communication with the packing bed 38 for purposes of supporting the same packing beds and for the effectual vapor liquid interaction therein. As has been shown experimentation and laboratory evaluation, supporting structure and/or other vapor liquid distribution paraphernalia have in certain instances been necessary in support of said vapor liquid interaction. However, the vapor liquid distribution mechanism 128 is shown to be sufficiently adaptable to a direct intersperse configuration as shown in FIG. 8 for purposes of high efficiency vapor liquid interaction in a fractionation tower constructed in accordance with the principles of the present invention as described above.

It is thus believed that the operation and construction of the present invention will be apparent from the foregoing description. While the mkthod and apparatus shown and described has been characterized as being preferred, it will be apparent that various changes and modifications may be made therein without departing from the spirit and scope of the invention as defined in the following claims.

What is claimed is:

1. A process column of the type facilitating enhanced interaction of vapor and liquid passing in counter-current flow therethrough and being constructed of a vessel having a liquid inlet and a vapor outlet in an upper region thereof and a liquid outlet and a vapor inlet in a lower region thereof for facilitating the counter-current flow of said liquid and vapor therethrough, with dispersion means for dispersing said liquid in said vessel and column packing means disposed within said vessel for passage of said liquid and vapor therethrough for the enhanced interaction therebetween, and wherein said column packing means includes a plurality of packing sections, at least a portion of said packing sections being structured packing of established height, and comprising an improved flow distribution packing for enhancing even distribution of liquid downwardly through said column packing, said flow distribution packing being positioned below said liquid dispersion means and above at least one of said column packing means, said flow distribution packing further comprising a plurality of relatively thin layers of corrugated sheets angularly oriented one to the other for lateral bi-directional dispersion and relatively full distribution of said liquid passing therethrough, and wherein said sections of corrugated sheets forming said flow distributor packing have a combined height of between one-half and one-third of the height of said structured packing section.

2. An apparatus for facilitating enhanced interaction of vapor and liquid passing in counter-current flow therethrough, said apparatus comprising:
    a vessel having a liquid inlet and a vapor outlet in an upper end portion thereof and a liquid outlet and a vapor inlet in a lower end portion thereof for facilitating the counter-current flow of said liquid and vapor therethrough;
    liquid dispersion means for dispersing said liquid in said vessel;
    column packing means disposed within said vessel for passage of said liquid and vapor therethrough and for enhancing interaction between said liquid and vapor;
    flow distribution packing means for enhancing even and concomitant distribution of liquid downwardly and of vapor ascending upwardly therethrough for homogenous interaction therein, said flow distribution packing means being positioned below said liquid dispersion means and above and below at least one of said column packing means, said flow distribution packing means comprising:
    a plurality of relatively thin layers of corrugated sheets angularly oriented one to the other for lateral bi-directional dispersion and relatively full distribution of said vapor and liquid passing therethrough; and
    said column packing means comprising a plurality of packing sections, at least a portion of said packing sections being structured packing of established height, and wherein said sections of corrugated sheets forming said flow distributor packing means have a combined height of between one-half and one-third of the height of said structured packing section.

3. The apparatus as set forth in claim 2 wherein three relatively thin layers of corrugated sheets comprise said flow distribution packing means, said sheets being disposed so as to be in face to fact contact such that the corrugations of said sheets are angularly oriented one to the other.

4. The apparatus of claim 3 wherein said corrugated sheets of said flow distribution packing means are provided with a plurality of apertures therethrough for affording pressure equalization therewithin during liquid and vapor flow therethrough.

* * * * *